United States Patent [19]

Stehle et al.

[11] Patent Number: 4,963,316

[45] Date of Patent: Oct. 16, 1990

[54] FUEL ROD FOR A NUCLEAR REACTOR FUEL ASSEMBLY

[75] Inventors: Heinz Stehle, Marloffstein; Hans Weidinger, Nuremberg; Eckard Steinberg, Erlangen; Friedrich Garzarolli, Hoechstadt-Aisch, all of Fed. Rep. of Germany

[73] Assignee: Siemens Aktiengesellschaft, Munich, Fed. Rep. of Germany

[21] Appl. No.: 222,268

[22] Filed: Jul. 21, 1988

[30] Foreign Application Priority Data

Jul. 21, 1987 [DE] Fed. Rep. of Germany ....... 3724145
Feb. 15, 1988 [DE] Fed. Rep. of Germany ....... 3804724

[51] Int. Cl.$^5$ .............................................. G21C 3/20
[52] U.S. Cl. .................................. 376/416; 376/457; 420/422
[58] Field of Search ................ 376/416, 457; 420/422

[56] References Cited

U.S. PATENT DOCUMENTS

| | | | |
|---|---|---|---|
| 4,233,834 | 11/1980 | Matinlassi | 72/208 |
| 4,717,534 | 1/1988 | Morita | 376/419 |
| 4,735,768 | 4/1988 | Stehle et al. | 376/417 |

FOREIGN PATENT DOCUMENTS

| | | |
|---|---|---|
| 0212351 | 3/1987 | European Pat. Off. . |
| 1207096 | 12/1965 | Fed. Rep. of Germany . |
| 1608735 | 8/1970 | Fed. Rep. of Germany . |
| 3310054 | 10/1983 | Fed. Rep. of Germany . |

*Primary Examiner*—Donald P. Walsh
*Attorney, Agent, or Firm*—Herbert L. Lerner; Laurence A. Greenberg

[57] ABSTRACT

A fuel rod for a nuclear reactor fuel assembly includes a cladding tube having an outer surface and a given total wall thickness. Nuclear fuel is disposed in the cladding tube. The cladding tube is formed of a first zirconium alloy which may have alloy components of from 1.2 to 2% by weight of tin, 0.07 to 0.2% by weight of iron, 0.05 to 0.15% by weight of chromium, 0.03 to 0.08% by weight of nickel, 0.07 to 0.15% by weight of oxygen, and a total percent by weight for the alloy components of iron, chromium and nickel in a range of from 0.18 to 0.38% by weight. The first zirconium alloy may also have alloy components of from 1.2 to 2% by weight of tin, 0.18 to 0.24% by weight of iron, 0.07 to 0.13% by weight of chromium, 0.10 to 0.16% by weight of oxygen, and a total percentage by weight for the components of iron and chromium in a range of from 0.28 to 0.37% by weight. A surface layer which is disposed on the outer surface of the cladding tube is formed of a second zirconium alloy having a layer thickness in a range of from 5 to 20% of the given total wall thickness of the cladding tube, the second zirconium alloy being formed of at least one alloy component from the group consisting of iron, chromium, nickel and tin having a total percentage by weight of the alloy components of the group of from 0.4 to 1% by weight and/or having from 0.2 to 3% by weight of niobium as an alloy component.

12 Claims, No Drawings

FUEL ROD FOR A NUCLEAR REACTOR FUEL ASSEMBLY

SPECIFICATION

The invention relates to a fuel rod for a nuclear reactor fuel assembly, including nuclear fuel in a cladding tube, the cladding tube being formed of a zirconium alloy having alloy components of from 1.2 to 2% by weight of tin, 0.07 to 0.2% by weight of iron, 0.05 to 0.15% by weight of chromium, 0.03 to 0.08% by weight of nickel, 0.07 to 0.15% by weight of oxygen, and a total percent by weight for the alloy components of iron, chromium and nickel in a range of from 0.18 to 0.38% by weight, or having alloy components of from 1.2 to 2% by weight of tin, 0.18 to 0.24% by weight of iron, 0.07 to 0.13% by weight of chromium, 0.10 to 0.16% by weight of oxygen, and a total percentage by weight for the components of iron and chromium in a range of from 0.28 to 0.37% by weight.

Fuel rods of this type are common. They are incorporated into the skeleton of the nuclear reactor fuel assembly, which is eventually inserted into a nuclear reactor where it is cooled, such as with light water In the nuclear reactor, the zirconium alloys of the cladding tubes have a relatively small capture cross section for thermal neutrons During operation in the nuclear reactor, corrosion occurs on the outside of the cladding tubes of the fuel rods, which limits the length of time for which the fuel assembly is usable in the nuclear reactor. Typical usage or dwell times are 3 to 4 years.

European Patent Application No. 0 212 351, corresponding to U.S. Pat. No. 4,735,768, discloses an improvement in the usability of such nuclear reactor fuel assemblies and a lengthening of the dwell times thereof in the nuclear reactor which is accomplished by means of a surface layer located on the outside of the cladding tube of the fuel rod of the type described above. The layer is formed of a zirconium alloy having alloy components which are at least one of vanadium, platinum and copper to which iron may be added.

A cladding tube of this kind is made by pilgering or pilger-rolling or forming a tubular blank, which is obtained by extrusion of an inside tube. An outside tube which is seated on the inside tube, is formed of the vanadium-containing zirconium alloys for the surface layer of the cladding tube.

The tubular blank must be pilgered with no more than a little deformation per pilgering increment, or in other words slowly, or else the outside tube formed of the vanadium-containing zirconium alloy will rupture.

It is accordingly an object of the invention to provide a fuel rod for a nuclear reactor fuel assembly, which overcomes the hereinafore-mentioned disadvantages of the heretofore-known products of this general type and which makes the manufacture of the cladding tube and therefore of the fuel rod as well more economical, by making the pilgering process faster.

With the foregoing and other objects in view there is provided, in accordance with the invention, a fuel rod for a nuclear reactor fuel assembly, comprising a cladding tube having an outer surface and a given total wall thickness, nuclear fuel disposed in the cladding tube, the cladding tube being formed of a first zirconium alloy having alloy components of from 1.2 to 2% by weight of tin, 0.07 to 0.2% by weight of iron, 0.05 to 0.15% by weight of chromium, 0.03 to 0.08% by weight of nickel, 0.07 to 0.15% by weight of oxygen, and a total percent by weight for the alloy components of iron, chromium and nickel in a range of from 0.18 to 0.38% by weight, or having alloy components of from 1.2 to 2% by weight of tin, 0.18 to 0.24% by weight of iron, 0.07 to 0.13% by weight of chromium, 0.10 to 0.16% by weight of oxygen, and a total percentage by weight for the components of iron and chromium in a range of from 0.28 to 0.37% by weight, and a surface layer disposed on the outer surface of the cladding tube being formed of a second zirconium alloy having a layer thickness in a range of from 5 to 20% of the given total wall thickness of the cladding tube, the second zirconium alloy being formed of at least one alloy component from the group consisting of iron, chromium, nickel and tin having a total percentage by weight of the alloy components of the group of from 0.4 to 1% by weight and/or having from 0.2 to 3% by weight of niobium as an alloy component.

The invention is based on the recognition that the zirconium alloy from which the surface layer on the outside of the cladding tube of this fuel rod is made is much more corrosion-resistant than the zirconium alloy from which the rest of the cladding tube is made, as in the prior art fuel rod. Furthermore, the cladding tube is very creep-resistant. Moreover, the absorption losses of thermal neutrons in the nuclear reactor through the alloy components in the surface layer of the cladding tube are relatively low. Nevertheless, this zirconium alloy can be deformed particularly severely during pilgering of the tubular blank without rupture, so that the pilgering requires very little time.

In accordance with a concomitant feature of the invention, the In this way, further improvement of the creep resistance of the cladding tube of the fuel rod is attained.

Fuel rods having a cladding tube formed solely of a zirconium-niobium alloy are known. However, a cladding tube of this kind creeps very considerably under the conditions that prevail in a nuclear reactor. In other words, the pressure of the coolant in the nuclear reactor presses the cladding tube against the nuclear fuel, so that its outside diameter shrinks and the fuel rod itself no longer remains firmly retained in a force-locking manner with the springs that are provided in the spacers that are part of the skeleton of nuclear reactor fuel assemblies. It therefore begins to vibrate and can be damaged. A force-locking connection is one which connects two elements together by force external to the elements, as opposed to a form-locking connection which is provided by the shapes of the elements themselves.

Tests in a nuclear reactor demonstrate that the corrosion speed of a test tube made from a zirconium alloy having 2.5% by weight of niobium as an alloy component, or 0.25% by weight of tin, 0.5% by weight of iron and 0.05% by weight of chromium as alloy components in water, is only approximately one-third the corrosion speed of a comparison tube made from a zirconium alloy having the trade name Zircaloy 4, under the same conditions. Besides zirconium, Zircaloy 4 contains further alloy components of from 1.2 to 1.7% by weight of tin, 0.18 to 0.24% by weight of iron, 0.07 to 0.13% by weight of chromium and 0.1 to 0.16% by weight of oxygen and the sum of the percentages by weight of the iron and chromium alloy components therein is in the range of from 0.28 to 0.37% by weight. The dwell time of a nuclear reactor fuel assembly having fuel rods according to the invention in a nuclear reactor can accordingly be at least one year longer than that of a nuclear reactor fuel assembly having fuel rods with cladding tubes which are firmed of Zircaloy 4, for instance, on the outside as well.

A tube made from a zirconium-vanadium-iron alloy having 0.5% by weight of iron and 0.25% by weight of vanadium already begins to rupture in a single pilgering, pilger-rolling or pilger forming step at approximately 40% cold deformation. However, this rupture does not begin in a tube having the same dimensions which is made from the zirconium-niobium alloy having 2.5% by weight of niobium or the zirconium-tin-iron-chromium alloy having 0.25% by weight of tin, 0.5% by weight of iron and 0.05% by weight of chromium, until more than 80% cold deformation, in a single pilgering, pilger-rolling or forming step.

Other features which are considered as characteristic for the invention are set forth in the appended claims.

Although the invention is illustrated and described herein as embodied in a fuel rod for a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

In order to manufacture a cladding tube for a fuel rod according to the invention, a tubular blank is advantageously used that has an inner tube made of Zircaloy 4, for instance, and an outer tube seated on the inner tube which is made of the zirconium-niobium alloy or the zirconium-tin-iron-chromium alloy. Both tubes are welded together at both ends in a vacuum, so that there is no gas between the two tubes. The tubular blank is heated to a temperature in the range from 650° C. to 850° C. and then extruded (see, for example, Hütte, Taschenbuch für Eisenhüttenleute, "Eisenhütte" [Hütte, Manual for Iron Workers, "Ironworking"], 1961, page 1083). Due to the coextrusion, a firm metallurgical bond is produced between the two zirconium alloys.

By ensuing pilgering, pilger-rolling or forming of the tubular blank, a final cladding tube for the fuel rod is finally obtained, which may, for example, have a diameter of 10.7 mm and a wall thickness of 0.72 mm. The surface layer formed of the zirconium alloy containing niobium or or the alloy containing tin, iron and chromium, covers the entire outside of the cladding tube and may, for example, be 0.1 mm thick. A pilgering machine is described in U.S. Pat. No. 4,233,834, for example.

We claim:

1. Fuel rod for a nuclear reactor fuel assembly, comprising a cladding tube having an outer surface and a given total wall thickness, nuclear fuel disposed in said cladding tube, said cladding tube being formed of a first zirconium alloy having alloy components of from 1.2 to 2% by weight of tin, 0.07 to 0.2% by weight of iron, 0.05 to 0.15% by weight of chromium, 0.03 to 0.08% by weight of nickel, 0.07 to 0.15% by weight of oxygen, and a total percent by weight for the alloy components of iron, chromium and nickel in a range of from 0.18 to 0.38% by weight, and a surface layer disposed on said outer surface of said cladding tube being formed of a second zirconium alloy having a layer thickness in a range of from 5 to 20% of said given total wall thickness of said cladding tube, said second zirconium alloy being formed of at least one alloy component from the group consisting of iron, chromium, nickel and tin having a total percentage by weight of the alloy components of said group of from 0.4 to 1% weight.

2. Fuel rod for a nuclear reactor fuel assembly, comprising a cladding tube having an outer surface and a given total wall thickness, nuclear fuel disposed in said cladding tube, said cladding tube being formed of a first zirconium alloy having alloy components of from 1.2 to 2% by weight of tin, 0.07 to 0.2% by weight of iron, 0.05 to 0.15% by weight of chromium, 0.03 to 0.08% by weight of nickel, 0.07 to 0.15% by weight of oxygen, and a total percent by weight for the alloy components of iron, chromium and nickel in a range of from 0.18 to 0.38% by weight, and a surface layer disposed on said outer surface of said cladding tube being formed of a second zirconium alloy having a layer thickness in a range of from 5 to 20% of said given total wall thickness of said cladding tube, said second zirconium alloy being formed of 0.2 to 3% by weight of niobium as an alloy component.

3. Fuel rod for a nuclear reactor fuel assembly, comprising a cladding tube having an outer surface and a given total wall thickness, nuclear fuel disposed in said cladding tube, said cladding tube being formed of a first zirconium alloy having alloy components of from 1.2 to 2% by weight of tin, 0.18 to 0.24% by weight of iron, 0.07 to 0.13% by weight of chromium, 0.10 to 0.16% by weight of oxygen, and a total percentage by weight for the components of iron and chromium in a range of from 0.28 to 0.37% by weight, and a surface layer disposed on said outer surface of said cladding tube being formed of a second zirconium alloy having a layer thickness in a range of from 5 to 20% of said given total wall thickness of said cladding tube, said second zirconium alloy being formed of at least one alloy component from the group consisting of iron, chromium, nickel and tin having a total percentage by weight of the alloy components of said group of from 0.4 to 1% by weight.

4. Fuel rod for a nuclear reactor fuel assembly, comprising a cladding tube having an outer surface and a given total wall thickness, nuclear fuel disposed in said cladding tube, said cladding tube being formed of a first zirconium alloy having alloy components of from 1.2 to 2% by weight of tin, 0.18 to 0.24% by weight of iron, 0.07 to 0.13% by weight of chromium, 0.10 to 0.16% by weight of oxygen, and a total percentage by weight for the components of iron and chromium in a range of from 0.28 to 0.37% by weight, and a surface layer disposed on said outer surface of said cladding tube being formed of a second zirconium alloy having a layer thickness in a range of from 5 to 20% of said given total wall thickness of said cladding tube, said second zirconium alloy being formed of 0.2 to 3% by weight of niobium as an alloy component.

5. Fuel rod according to claim 1, wherein said alloy component of tin in said first zirconium alloy amounts to from 1.5 to 2% by weight.

6. Fuel rod according to claim 1, wherein said alloy component of tin in said first zirconium alloy amounts to from 1.5 to 2% by weight.

7. Fuel rod according to claim 2, wherein said alloy component of tin in said first zirconium alloy amounts to from 1.5 2% by weight.

8. Fuel rod according to claim 3, wherein said alloy component of tin in said first zirconium alloy amounts to from 1.5 to 2% by weight.

9. Fuel rod according to claim 2, wherein said alloy component of tin in said first zirconium alloy amounts to from 1.5 to 2% by weight.

10. Fuel rod according to claim 4, wherein said alloy component of tin in said first zirconium alloy amounts to from 1.5 to 2% by weight.

11. Fuel rod according to claim 1, wherein said second zirconium alloy also has from 0.2 to 3% by weight of niobium as an alloy component.

12. Fuel rod according to claim 3, wherein said second zirconium alloy also has from 0.2 to 3% by weight of niobium as an alloy component.

* * * * *